(12) United States Patent
Mei et al.

(10) Patent No.: US 11,549,749 B2
(45) Date of Patent: Jan. 10, 2023

(54) PELLET DRYING AND DEGASSING METHOD

(71) Applicant: Basell Polyolefine GmbH, Wesseling (DE)

(72) Inventors: Giulia Mei, Ferrara (IT); Juergen Mohrbutter, Alfter (DE); Dieter Littmann, Muecke (DE); Christoph Wolf, Pulheim-Dansweiler (DE); Andre-Armand Finette, Cologne (DE); Michael Deuerling, Weilerswist (DE); Giuseppe Penzo, Ferrara (IT)

(73) Assignee: Basell Polyolefine GmbH, Wesseling (DE)

(*) Notice: Subject to any disclaimer, the term of this patent is extended or adjusted under 35 U.S.C. 154(b) by 487 days.

(21) Appl. No.: 16/623,579

(22) PCT Filed: Jun. 21, 2018

(86) PCT No.: PCT/EP2018/066666
§ 371 (c)(1),
(2) Date: Dec. 17, 2019

(87) PCT Pub. No.: WO2019/002100
PCT Pub. Date: Jan. 3, 2019

(65) Prior Publication Data
US 2021/0148633 A1 May 20, 2021

(30) Foreign Application Priority Data

Jun. 26, 2017 (EP) .................................... 17177770

(51) Int. Cl.
*F26B 3/06* (2006.01)
*B01J 2/20* (2006.01)
(Continued)

(52) U.S. Cl.
CPC .................. *F26B 3/06* (2013.01); *B01J 2/20* (2013.01); *C08F 110/02* (2013.01); *F26B 5/08* (2013.01); *F26B 17/22* (2013.01); *F26B 21/005* (2013.01)

(58) Field of Classification Search
CPC .... F26B 3/06; F26B 5/08; F26B 17/22; F26B 21/005; F26B 9/03; B01J 2/20;
(Continued)

(56) References Cited

U.S. PATENT DOCUMENTS 4,030,205 A 6/1977 Robertson et al.
4,342,853 A * 8/1982 Durand .................... C08F 6/28
526/68

(Continued)

FOREIGN PATENT DOCUMENTS

EP 2351637 A1 8/2011
RU 2326899 C1 6/2008
WO 01070473 A1 9/2001

OTHER PUBLICATIONS

Gala Industries, Centrifugal Dryers, Sep. 1, 2007, pp. 1-6, XP002512385, Retrieved from the Internet: URL: http://www.gala-industries.com/downloads/corp_brochures/Dryers.pdf.
(Continued)

*Primary Examiner* — John P McCormack (57) ABSTRACT

Method for the preparation of dried polymer pellets in a facility having a dryer with a first chamber and a mechanical agitator, and the facility further having a degassing silo with a second chamber, the method includes the steps of guiding a drying gas flow made from or containing a first gas mixture for drying wet polymer pellets into the first chamber, transferring the dried polymer pellets into the second chamber, guiding a second gas mixture for degassing the dried polymer pellets into the second chamber thereby transforming the second gas mixture into a third gas mixture and guiding a portion of the third gas mixture into the first chamber; and process for manufacturing LDPE pellets.

18 Claims, 3 Drawing Sheets

(51) Int. Cl.
*C08F 110/02* (2006.01)
*F26B 5/08* (2006.01)
*F26B 17/22* (2006.01)
*F26B 21/00* (2006.01)

(58) Field of Classification Search
CPC ... B29B 2009/168; B29B 13/065; B29B 9/16; B29B 9/065; B29B 9/03; B29K 2023/0633; B29K 2105/251; C08F 110/02
USPC .......................................................... 526/68
See application file for complete search history.

(56) References Cited

U.S. PATENT DOCUMENTS

| | | |
|---|---|---|
| 4,820,463 A | 4/1989 | Raufast |
| 5,911,928 A | 6/1999 | Shimazu et al. |
| 8,359,765 B2 | 1/2013 | Doll et al. |
| 9,126,353 B2 | 9/2015 | Rahim et al. |
| 9,216,548 B2 * | 12/2015 | Karbasi ................... C08F 6/005 |
| 2008/0185758 A1 | 8/2008 | Damme |
| 2010/0004408 A1 * | 1/2010 | Baita ....................... C08F 6/005 |
| | | 526/71 |
| 2010/0126036 A1 | 5/2010 | Doll et al. |
| 2011/0214699 A1 | 9/2011 | Sasai |
| 2011/0245445 A1 * | 10/2011 | Karbasi ............... B29C 71/0009 |
| | | 526/348 |
| 2012/0077951 A1 | 3/2012 | Hanimann et al. |
| 2015/0021807 A1 | 1/2015 | Boothe et al. |
| 2015/0135645 A1 * | 5/2015 | Colls ..................... B29B 9/065 |
| | | 53/113 |
| 2016/0331005 A1 | 11/2016 | Benali |

OTHER PUBLICATIONS

The International Search Report and The Written Opinion for PCT/EP2018/066666 dated Aug. 28, 2018.

* cited by examiner

Fig. 5

PELLET DRYING AND DEGASSING METHOD

This application is the U.S. National Phase of PCT International Application PCT/EP2018/066666, filed Jun. 21, 2018, claiming benefit of priority to European Patent Application No. 17177770.9, filed Jun. 26, 2017, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure relates to a method for drying and degassing polymer pellets and a process for manufacturing LDPE-pellets therefrom.

BACKGROUND OF THE INVENTION

In some instances, polymers are formed by a polymerization reaction wherein monomer fluids are reacted at high pressure conditions. Various methods are used to obtain polymer pellets therefrom and then dry the polymer pellets.

SUMMARY OF THE INVENTION

In a general embodiment, the present disclosure provides a method for the preparation of dried polymer pellets in a facility. The facility has a dryer with a first chamber having an upper and a lower end having a first polymer inlet, a first polymer outlet above the first polymer inlet, a first gas inlet at the upper end, a first gas outlet below the first gas inlet and a mechanical agitator. Furthermore, the facility has a degassing silo with a second chamber having a second polymer inlet, a second polymer outlet, a second gas inlet, and a second gas outlet. The method includes the steps:
i) guiding a drying gas flow of a first gas mixture through the first gas inlet into the first chamber,
ii) inserting wet polymer pellets through the first polymer inlet into the first chamber,
iii) drying the wet polymer pellets in a countercurrent provided by the drying gas flow and by using the mechanical agitator, thereby yielding dried polymer pellets,
iv) transferring the dried polymer pellets through the first polymer outlet and the second polymer inlet into the second chamber,
v) guiding a second gas mixture through the second gas inlet into the second chamber,
vi) degassing the dried polymer pellets using the second gas flow, thereby transforming the second gas mixture into a third gas mixture made from or containing hydrocarbons, and
vii) guiding a portion of the third gas mixture into the first chamber.

In some embodiments, the wet polymer pellets inserted into the first chamber in step ii) have a temperature of from 20° C. to 80° C. and the second gas mixture guided into the second chamber in step v) have a temperature of from 20° C. to 80° C.

In some embodiments, dried polymer pellets having a reduced hydrocarbon content are withdrawn from the second chamber through the second polymer outlet and the dried polymer pellets withdrawn through the second polymer outlet have a temperature which is from 0.1° C. to 20° C. higher than the temperature of the second gas mixture guided into the second chamber.

In some embodiments, the portion of the third gas mixture forms the first gas mixture and is guided through the first gas inlet into the first chamber.

In some embodiments, the portion of the third gas mixture does not form the first gas mixture, but is added to the drying gas flow of the first gas mixture and is guided through the first gas inlet into the first chamber.

In some embodiments, the first chamber has a third gas inlet spaced apart from the first gas inlet and the portion of the third gas mixture is guided through the third gas inlet into the first chamber.

In some embodiments, the third gas mixture is made from or contains more hydrocarbons than the second gas mixture, wherein the hydrocarbons contain residual monomeric units of the polymer pellets.

In some embodiments, the polymer pellets are polyolefin pellets.

In some embodiments, the polymer of the polymer pellets is a low density polyethylene.

In some embodiments, the drying unit includes a first separation unit having a separation sieve, wherein agglomerates, larger particles, or both are removed using the separation sieve prior to insertion of the wet polymer pellets into the first chamber. In some embodiments, the first separation unit is placed adjacent to the first chamber being at least partially at the same height as the first gas outlet or as the first polymer outlet.

The drying gas flow becomes wet during the drying process. In some embodiments, the resulting wet gas mixture is guided through the first gas outlet to a second separation unit and through the second separation unit to at least one suction fan, wherein the second separation unit is a cyclone separator, wherein the cyclone separator removes remaining polymer pellets, other particles or condensed fluid droplets, wherein the suction fan evacuates the wet gas from the first chamber and though the second separation unit.

In some embodiments, the first gas flow, the third gas flow, or both are heated prior to being guided into the first chamber using a heating unit. In some embodiments, the heating unit is a steam-operated heater.

In some embodiments, the first polymer inlet is arranged below the first gas outlet which is arranged below the first polymer outlet which is arranged below the first gas inlet.

In some embodiments, the wet pellets are conveyed by process water of an underwater pellet cutter, for inserting into the first chamber in accordance with step ii).

In some embodiments, the dryer is a spin dryer, wherein moisture is removed by a centrifugal force as well as the drying gas flow.

In some embodiments, the first, second and third gas mixtures predominantly contain nitrogen, oxygen, or both.

In some embodiments, the first gas inlet is arranged centrally at the upper end, thereby the drying gas flow is directed towards the opposing bottom end.

In a general embodiment, the present disclosure also provides a process for manufacturing LDPE-pellets in an industrial plant, wherein the industrial plant includes a reactor for polymerization reactions, an extruder and the facility as described above. As such, the facility has a dryer with a first chamber having an upper and a lower end having a first polymer inlet, a first polymer outlet above the first polymer inlet, a first gas inlet at the upper end, a first gas outlet below the first gas inlet and a mechanical agitator. Furthermore, the facility has a degassing silo with a second chamber having a second polymer inlet, a second polymer outlet, a second gas inlet, and a second gas outlet. The process includes the steps of a) polymerizing ethylene in the reactor at a temperature of 140 to 320° C. and a pressure of 1400 to 3200 bar, thereby yielding a LDPE polymer,
b) separating the LDPE polymer and ethylene and recycling unreacted ethylene,
c) extruding the LDPE polymer to obtain a homogenized LDPE melt,
d) pelletizing the LDPE melt to obtain wet LDPE pellets using an underwater pellet cutter, and
e) drying and degassing the wet LDPE pellets using a method in accordance with one or several of the above-identified embodiments of drying methods.

DETAILED DESCRIPTION OF THE INVENTION

In some embodiments, the present disclosure provide a method for the preparation of dried polymer pellets in a facility. The facility has a dryer with a first chamber having an upper and a lower end having a first polymer inlet, a first polymer outlet above the first polymer inlet, a first gas inlet at the upper end, a first gas outlet below the first gas inlet and a mechanical agitator. The facility has a degassing silo with a second chamber having a second polymer inlet, a second polymer outlet, a second gas inlet, and a second gas outlet. The method includes the following steps:

i) guiding a drying gas flow made from or containing a first gas mixture through the first gas inlet into the first chamber, alternatively downwards and thereby resulting in a helical flow,
ii) inserting wet polymer pellets, alternatively pellets coming from an underwater pellet cutter, through the first polymer inlet into the first chamber, alternatively wherein the pellets are moved upwards using lifter blades of the mechanical agitator,
iii) drying the wet polymer pellets in a countercurrent provided by the drying gas flow and by using the mechanical agitator, alternatively by a centrifugal force caused by the mechanical agitator, thereby yielding dried polymer pellets,
iv) transferring the dried polymer pellets through the first polymer outlet and the second polymer inlet into the second chamber, alternatively using a pipe connecting the first and second chamber,
v) guiding a second gas mixture through the second gas inlet into the second chamber, alternatively gas is provided by a supply line from an external source,
vi) degassing the dried polymer pellets using the second gas flow, thereby transforming the second gas mixture into a third gas mixture made from or containing hydrocarbons, and
vii) guiding a portion of the third gas mixture into the first chamber, alternatively in accordance with step i), wherein the portion of the third gas mixture is the first gas mixture, or both.

It is believed that the drying process relies on drying pellets in a countercurrent flow of the reused gas in combination with removal of liquid using centrifugal forces caused by the mechanical agitator. In some embodiments, some of the heat from the degassing silo is used in the first chamber of the dryer. It is believed that introducing hydrocarbons from the degassing silo into the drying gas for the dryer does not adversely affect safety or the efficiency of drying.

As used herein, it should be understood that the use of "and/or" is defined inclusively, such that the term "a and/or b" should be read to include the sets: "a and b", "a or b", "a", "b". In some cases, "a and/or b" relates to two entities "a" and "b", wherein at least one of the entities is present in the embodiment described.

As used herein, a pellet is a particle that may have any shape or size. Alternatively, a particle has a rounded, spherical, or cylindrical body. Alternatively, the size is of a pellet in the range of 0.05 mm to 25 mm, alternatively 0.1 mm to 10 mm, alternatively 0.5 mm to 4 mm.

As used herein, the term "dried" or "drying' refers to the removal of a diluent, which may be any liquid, such as a hydrocarbon liquid or water. Alternatively, the liquid is water, alternatively water of an underwater pellet cutter. As used herein, the term "wet" refers to the presence of liquid; accordingly, wet pellets contain more liquid than dried pellets. By removing the liquid, the pellets are dried.

As used herein, the term "degassing" or "degassed" refers to the removal of unreacted monomers and other hydrocarbon compounds from particulate polymer. In some embodiments, the polymer products obtained by a polymerization contain such unreacted monomers and other hydrocarbon compounds. It is believed that removal of these compounds from the polymer product will prevent hydrocarbons reaching explosive levels in downstream equipment, exceeding environmental constraints, or adverse product quality such as with odors. In some embodiments, the monomers or other hydrocarbon compounds include ethylene, comonomer(s), oligomers, solvents, polymerization additives, impurities present in any of the materials used in the polymerization, or materials employed for lubricating moving parts of the reactors. In some embodiments, degassing involves contacting the particulate polymer with a stream of an inert gas. In some embodiments, the contact involves a countercurrent flow.

As used herein, the term "gas mixture" relates to a mixture of different gases. In some embodiments, the gas mixture includes nitrogen and a hydrocarbon gas. In some embodiments, the gas mixture contains air. In some embodiments, the gas mixture contains additional gases, alternatively as a hydrocarbon gas, alternatively ethylene.

As described herein an underwater pellet cutter is a cutting device that cuts polymer strand under water into pellets. An underwater pellet cutter includes an underwater pellet cutting chamber and is part of an underwater pelletizer. The water used in the cutter is termed "process water." The process water transports the pellets and ensures cooling of the pellets as the pellets are cut. Alternatively, the wet pellets are conveyed by the process water for insertion into the first chamber in accordance with step ii).

As used herein, the terms "up", "down", "lower", "upper", "below", "above" and similar terms indicate a direction aligned with the direction of the force of gravity if the facility is set in an operational condition. "Above" and "below" indicate a difference in height; that is, "above" means farther up while "below" means farther down. The terms do not indicate that the elements are lying on top of each other, for example, in a superimposing manner. As such and in some embodiments, a polymer inlet is arranged below a polymer outlet, wherein the polymer inlet and outlet are arranged at opposing walls of a chamber provided that the polymer inlet is arranged at a lower height. Height is also measured along the direction of the force of gravity if the facility is set in an operational condition.

In some embodiments, the portion of the third gas mixture forms the first gas mixture and is guided through the first gas inlet into the first chamber. In some embodiments and without the use of external air, the third gas mixture leaving the degassing silo provides sufficient drying air for the dryer. In some embodiments, some of the gas leaving the degassing silo is used for the dryer. Some of the third gas mixture is discarded. However, a portion of the third gas mixture is used as drying gas and forms the first gas mixture, that is, another gas mixture is not added to the portion of third gas mixture to form the first gas mixture. It is believed that these embodiments more completely reduce waste gas while providing an efficient drying process.

In some embodiments, the portion of the third gas mixture does not form the first gas mixture, but is added to the drying gas flow of the first gas mixture and is guided through the first gas inlet into the first chamber. In these embodiments, the portion of the third gas mixture forms a portion of the first gas mixture. It is believed that some embodiments provide a continuous first gas stream if the gas is branched off from the degassing silo and that other gas is added.

In some embodiments, the first chamber has a third gas inlet spaced apart from the first gas inlet and the portion of the third gas mixture is guided through the third gas inlet into the first chamber. In some embodiments, this configuration regulates the amount of first and third gas mixture.

In some embodiments, the third gas mixture is made from or contains more hydrocarbons than the second gas mixture, wherein the hydrocarbons contain residual monomeric units of the polymer forming the polymer pellets. In some embodiments, the second gas mixture is air, alternatively air supplied by an external source. In some embodiments and when the second gas mixture enters the second chamber, the composition changes to a third gas mixture. In some embodiments, the difference in composition between the second and third gas mixture is attributable to residual monomeric units of the polymer, other hydrocarbon gases, or both that have been added to the second mixture during the degassing process.

In some embodiments, the polymer of the polymer pellets is polyethylene or ethylene vinyl acetate copolymers, alternatively polyethylene. In some embodiments, the polymer is low density polyethylene. As used herein, low density polyethylene is abbreviated as LDPE.

In some embodiments, the drying unit includes a first separation unit having a separation sieve, wherein agglomerates, larger particles, or both are removed using the separation sieve prior to insertion of the wet polymer pellets into the first chamber. It is believed that removing agglomerates, larger particles or both increases the speed of the drying process and prevents mechanical blockage. In some embodiments, this first separation unit is placed adjacent to the first chamber being at least partially at the same height as the first gas outlet or as the first polymer outlet, thereby introducing polymer pellets into the first chamber.

The drying gas flow becomes wet during the drying process. In some embodiments, the resulting wet gas mixture is guided through the first gas outlet to a second separation unit and through the second separation unit to at least one suction fan, wherein the second separation unit is a cyclone separator, wherein the cyclone separator removes remaining polymer pellets, other particles or condensed fluid droplets, wherein the suction fan evacuates the wet gas from the first chamber and though the second separation unit. The separation unit protects the suction fan from the remaining polymer pellets, other particles or condensed fluid droplets and prevents transferring particles to a waste gas treatment unit, alternatively a regenerative thermal oxidizer.

In some embodiments, the cyclone separator is equipped with a water connection for cleaning purposes, wherein the water is introduced through a restriction orifice of the cyclone separator. In some embodiments, the restriction orifice has a smaller diameter than the internal pipe diameter of the feeding line, thereby limiting the feed of water and preventing damage to the cyclone. In some embodiments and at high levels of water, a feeding valve is closed automatically.

In some embodiments, the mechanical agitator is a sectional rotor with a modular design or a one-piece rotor with a solid rotor shaft.

In some embodiments, the first gas flow, the third gas flow, or both are heated prior to being guided into the first chamber using a heating unit. In some embodiments, heating of the first gas flow, the third gas flow, or both ensures a efficient drying. In some embodiments, the heating unit is a steam-operated heater or a water-operated heater. In some embodiments, the heating unit is a low pressure steam-operated heater.

In some embodiments, the first polymer inlet is arranged below the first gas outlet which is arranged below the first polymer outlet which is arranged below the first gas inlet. In some embodiments, the pellets are introduced lowest from the inlets and outlets, thereby the pellets have a high degree of wetness and the dryer has less moisture in higher regions.

In some embodiments, the first polymer outlet is arranged at a distance above the first gas outlet such that the first gas inlet and the first polymer outlet are farther away than the distance. In some embodiments, this arrangement on a side prevents wet gas form accompanying polymer pellets when leaving through the first polymer outlet and on the other side wet air is removed through the first gas outlet without carrying the polymer pellets with the wet gas, alternatively wet air.

In some embodiments, the dryer is a spin dryer, wherein moisture is removed by a centrifugal force as well as the drying gas flow. In some embodiments, the dryer includes a mechanical agitator that has rotor lifter blades, which are designed and configured to lift the pellets upwards, alternatively in a helical movement. Excess moisture is largely removed by centrifugal forces. In some embodiments, a screen is provided that prevents removal of pellets with the liquid, alternatively a screen that is a sieve, alternatively a metal sieve.

In some embodiments, the degassing silo is charged continuously with pellets. In some embodiments, the degassing silo is charged discontinuously with pellets. In some embodiments, the degassing air, that is, the second gas mixture, is inserted continuously into the degassing silo.

In some embodiments, the second gas mixture guided into the second chamber in step v) is brought to a temperature of from 20° C. to 80° C., alternatively from 30° C. to 70° C., alternatively from 40 C to 60° C., before being inserted into the second chamber. In some embodiments, the wet polymer pellets inserted into the first chamber in step ii) have a temperature of from 20° C. to 80° C., alternatively from 30° C. to 70° C., alternatively from 40 C to 60° C.

In some embodiments, dried polymer pellets having a reduced hydrocarbon content are withdrawn from the second chamber through the second polymer outlet, wherein the withdrawn polymer pellets have a temperature which is from 0.1° C. to 20° C., alternatively from 0.5° C. to 15° C., alternatively from 1° C. to 10° C., higher than the temperature of the second gas mixture guided into the second chamber.

In some embodiments of the degassing silo, the second polymer inlet is above the second polymer outlet and a second gas inlet is arranged below the second gas outlet. In some embodiments, there are multiple second gas inlets arranged below a single second gas outlet. In some embodiments, a second gas outlet is arranged at the top of the degassing silo, a second polymer outlet is arranged below the second gas outlet and at the bottom a second polymer outlet is arranged below multiple second gas inlets.

In some embodiments, the first, second and third gas mixtures predominantly contain nitrogen, oxygen, or both. In some embodiments, the first, second and third gas mixtures predominantly contain air. In some embodiments, additional gases are present. In some embodiments, additional gases are present in the first gas mixture, the third gas mixture, or both. In some embodiments, the additional gases are hydrocarbons originating from the degassing process.

In some embodiments, the method is for preparing dried polyolefin pellets. In some embodiments, the polyolefins are obtained by homopolymerizing or copolymerizing 1-olefins, that is, hydrocarbons having terminal double bonds. In some embodiments, the 1-olefins are nonpolar olefinic compounds. In some embodiments, the 1-olefins are linear or branched $C_2$-$C_{12}$-1-alkenes. In some embodiments, the 1-olefins are linear $C_2$-$C_{10}$-1-alkenes selected from the group consisting of ethylene, propylene, 1-butene, 1-pentene, 1-hexene, 1-heptene, 1 octene, and 1-decene. In some embodiments, the branched $C_2$-$C_{10}$-1-alkenes are 4-methyl-1-pentene. In some embodiments, the 1-olefins are conjugated or nonconjugated dienes such as 1,3-butadiene, 1,4-hexadiene or 1,7-octadiene. In some embodiments, the compositions for polymerization are mixtures of 1-olefins. In some embodiments, the olefins have the double bond as part of a cyclic structure which having one or more ring systems. In some embodiments, the cyclic olefins are selected from the group consisting of cyclopentene, norbornene, tetracyclododecene, methylnorbornene, 5-ethylidene-2-norbornene, norbornadiene and ethylnorbornadiene. In some embodiments, the compositions for polymerization are mixtures of two or more olefins.

In some embodiments, the polymers are polyethylenes having an ethylene content of from 50 to 100 wt. %, alternatively from 80 to 100 wt. %, alternatively from 98 to 100 wt. %. In some embodiments, the content of other olefins in the polyethylenes is from 0 to 50 wt. %, alternatively from 0 to 20 wt. %, alternatively from 0 to 2 wt. %.

In some embodiments, the density of polyethylenes ranges from 0.90 g/cm$^3$ to 0.97 g/cm$^3$. In some embodiments, the density is in the range of from 0.90 to 0.95 g/cm$^3$, alternatively in the range of from 0.91 to 0.94 g/cm$^3$. As used herein, the density is determined according to DIN EN ISO 1183-1:2004, Method A (Immersion) with compression molded plaques of 2 mm thickness which were pressed at 180° C., 20 MPa for 8 minutes with subsequent crystallization in boiling water for 30 minutes.

In some embodiments, the first gas inlet is arranged centrally at the upper end, thereby the drying gas flow is directed towards the opposing bottom end and provides a strong countercurrent to polymer pellets that move upwards within the drying chamber. In some embodiments, pointing downwards towards the opposing bottom end is a vertical direction downwards. In some embodiments, the downward direction is not vertical. In some embodiments, the downward direction supports movement of polymer pellets through the first polymer outlet.

In some embodiments, the drying gas flow is directed downwards along a helical pathway.

In some embodiments, the portion of the third gas mixture relates to 1 to 90% of the amount of second gas mixture, alternatively 10 to 80%, alternatively 20 to 60%.

In a general embodiment, the present disclosure also provides a process for manufacturing LDPE-pellets in an industrial plant, wherein the industrial plant includes a reactor for polymerization reactions, an extruder and the facility as described above. As such, the facility has a dryer with a first chamber having an upper and a lower end with a first polymer inlet, a first polymer outlet above the first polymer inlet, a first gas inlet at the upper end, a first gas outlet below the first gas inlet and a mechanical agitator. Furthermore, the facility has a degassing silo with a second chamber having a second polymer inlet, a second polymer outlet, a second gas inlet, and a second gas outlet. The process includes the steps of a) polymerizing ethylene in the reactor at a temperature of 140 to 320° C. and a pressure of 1400 to 3200 bar, thereby yielding a LDPE polymer b) separating the LDPE polymer and ethylene and recycling unreacted ethylene, c) extruding the LDPE polymer to obtain a homogenized LDPE melt, d) pelletizing the LDPE melt to obtain wet LDPE pellets using an underwater pellet cutter, and e) drying and degassing the wet LDPE pellets using a method in accordance with one or several of the above discussed embodiments of drying methods.

Figure 1:
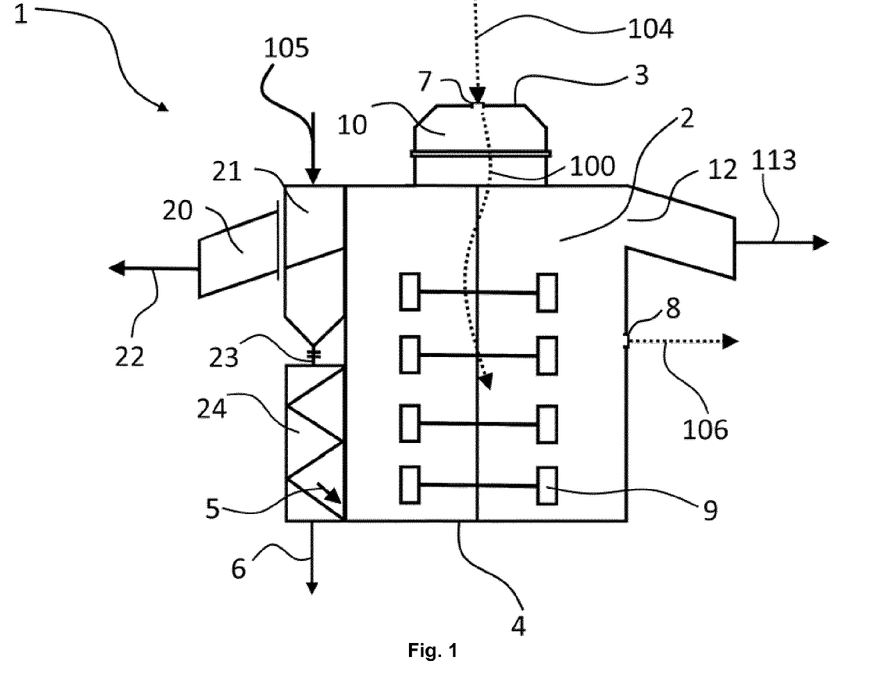
FIG. 1 shows a schematic view of a pellet dryer.

FIG. 1 shows a dryer (1) for drying polymer pellets. The dryer (1) has a first chamber (2) with an upper end (3) and a lower end (4) having a first polymer inlet (5), a first polymer outlet (12) above the polymer inlet (5), a first gas inlet (7) at the upper end (3), a first gas outlet (8) for wet gas (106) below the first gas inlet (7) and a mechanical agitator (9). The first gas inlet (7) is arranged in a top part (10) of the dryer (1) and designed to receive a first gas mixture (104). The first gas mixture (104) causes a drying gas flow (100) within the first chamber (2).

The dryer (1) is designed to receive wet polymer pellets or a suspension of pellets in a liquid such as water (105). The pellets are freed of agglomerates, larger particles, or both in a chamber (21). The agglomerates, the larger particles, or both leave through an exit port (20) towards a waste unit (22), whereas pellets drop though a separation sieve and an inlet (23) to a chute (24) for inserting the polymer pellets through the first polymer inlet (5). When providing the dryer (1) with a suspension of pellets in a liquid (105), the pellets and the liquid are separated and a flow of liquid (6) exits the dryer (1) at the bottom.

The drying gas flow (100) including a first gas mixture is led through the first gas inlet (7) into the first chamber (2). Wet polymer pellets are inserted through the first polymer inlet (5) into the first chamber (2). When the mechanical agitator (9) rotates, pellets are transported upwards to the first polymer outlet (12). During transport, the liquid is removed by a centrifugal force caused by the mechanical agitator (9). Additionally, the wet polymer pellets are dried in a countercurrent provided by the drying gas flow (100). The first polymer outlet (12) leads to a duct that transports the dried polymer (113) to the degassing silo (112, not shown).

Figure 2:
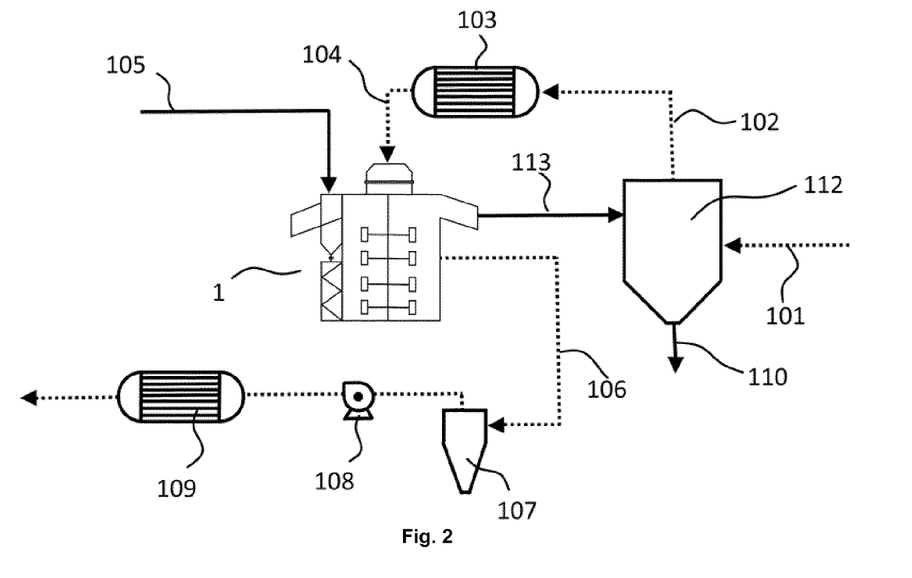
FIG. 2 shows a schematic view of a drying method for pellets.

FIG. 2 shows a schematic view of a drying method for pellets, including the dryer (1) of FIG. 1. The method includes the steps of guiding a drying gas flow (not shown) of a first gas mixture (104) into the first chamber of the dryer (1). Wet polymer pellets or a suspension of polymer pellets in a liquid (105) are transported into, dryer (1). The drying gas becomes wet and the resulting wet gas (106) leaves the dryer (1). The wet gas is forwarded to a cyclone separator (107) wherein residual pellets, particles and droplets are removed. The gas is evacuated from the first chamber using a suction fan (108). Afterwards, the gas is heated using a second heating unit (109), that is a steam-operated heater, before the gas is transported to a waste gas treatment unit, alternatively a regenerative thermal oxidation plant.

Dried polymer (113) is transported through a second polymer inlet into the second chamber (112) of a degassing silo, which is connected to a feed of a second gas mixture (101). Dry and degassed polymer (110) leaves the degassing silo through a second polymer outlet. A third gas mixture (102) is obtained by adding hydrocarbons from the degassing process to the second gas mixture (101). A portion of the third gas mixture (102) is heated in a first heating unit that is a steam-operated heater (103) and forms the first gas mixture (104). The first gas mixture (104) and the portion of the third gas mixture (102) are the same. The other portion of the third gas mixture (not shown) may be transported to a waste gas treatment unit, alternatively a regenerative thermal oxidizer.

Figure 3:
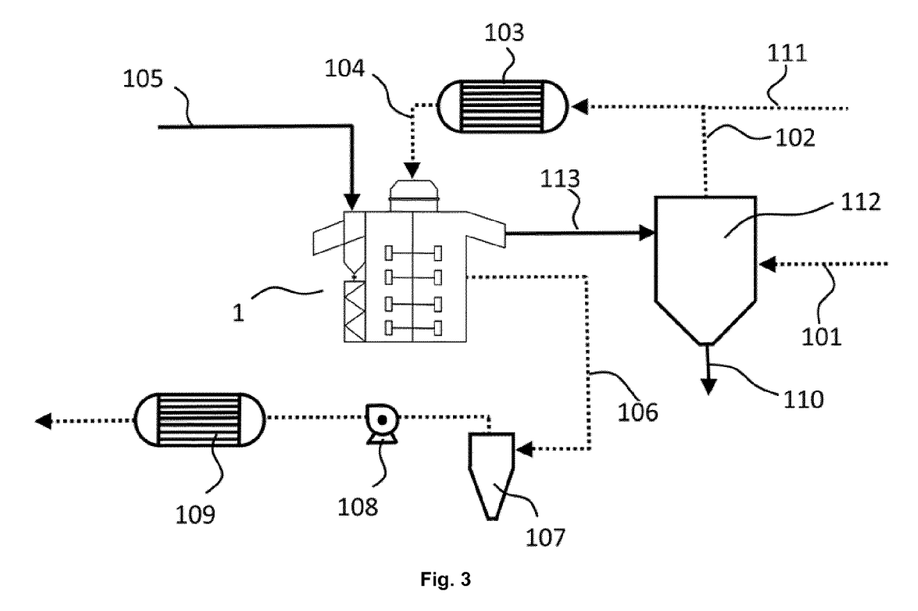
FIG. 3 shows a schematic view of a drying method for pellets.

FIG. 3 shows another drying method for pellets, including the dryer (1) of FIG. 1. The method includes the steps of guiding a drying gas flow (not shown) of a first gas mixture (104) into the first chamber of the dryer (1). Wet polymer pellets (105) are dried in dryer (1). The drying gas becomes wet, and the resulting wet gas (106) leaves the dryer (1). The wet gas is forwarded to a cyclone separator (107) wherein residual pellets, particles and droplets are removed. The gas is evacuated from the first chamber using a suction fan (108). Afterwards, the gas is heated using a second heating unit (109), that is a steam-operated heater, before the gas is transported to a waste gas treatment unit, alternatively a regenerative thermal oxidation plant.

Dried polymer (113) is transported through a second polymer inlet into the second chamber (112) of a degassing silo, which is connected to a feed of a second gas mixture (101). Dry and degassed polymer (110) leaves the degassing silo through a second polymer outlet and a portion of the third gas mixture (111) is routed to the first chamber. The drying method of FIG. 3 differs from the drying method of FIG. 2 in that the third gas mixture (102) is not identical with the first gas mixture (104). In the drying method of FIG. 3, the third gas mixture (102) is added to an external gas feed (111), thereby providing the first gas mixture (104) that is guided into the first chamber. The portion of third gas mixture (102) has a higher hydrocarbon content than the first gas mixture (104). The other portion of the third gas mixture may be transported to a waste gas treatment unit, alternatively a regenerative thermal oxidizer.

Figure 4:
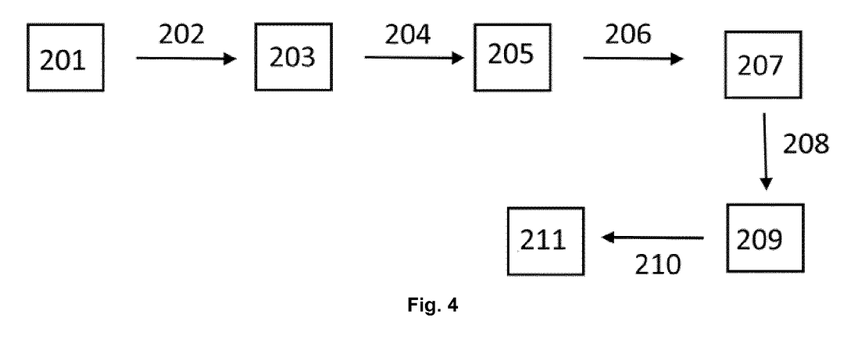
FIG. 4 shows a schematic view of a process for manufacturing LDPE-pellets.

FIG. 4 shows a schematic view of a process for manufacturing LDPE-pellets in an industrial plant. The industrial plant includes a reactor for polymerization reactions, an extruder and a facility, wherein the facility has a dryer and a degassing silo. In a first step (201), ethylene is polymerized in the reactor at a temperature of 140 to 320° C. and a pressure of 1400 to 3200 bar. Afterwards, the obtained polymers are transferred (202) to a separation unit (203) and ethylene and polymer are separated in the separation unit (203). The degassed polymers are transported (204) to an extruder (205) to obtain LDPE-extrudates. The extrudates are transported (206) to a pelletizer (207). Afterwards, the wet pellets are transported (208) to the dryer (209) and subsequently transported (210) to the degasser unit (211). (The dryer is described with reference to dryer (1) of FIG. 1.)

Figure 5:
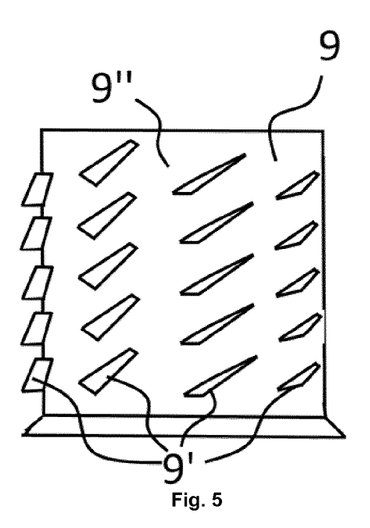
FIG. 5 shows a schematic view of a mechanical agitator of a pellet dryer.

FIG. 5 shows a mechanical agitator (9). The agitator has a plurality of identical rotor lifter blades (9') that carry pellets upwards. The rotor lifter blades are arranged around a central shaft (9"). It is believed that the shaft can be segmented into several pieces. Speed of rotation and shape of the rotor lifter blades move the pellets upwards within the first chamber in a helical pathway.

The invention claimed is:

1. A method for the preparation of dried polymer pellets having a reduced hydrocarbon content in a facility, wherein the pellets are prepared by using an extruder thereby producing polymer strands, and wherein the polymer strands are cut into pellets in an underwater pellet cutter thereby resulting in wet polymer pellets, the facility having a dryer with a first chamber having an upper and a lower end having a first polymer inlet, a first polymer outlet above the first polymer inlet, a first gas inlet at the upper end, a first gas outlet below the first gas inlet and a mechanical agitator, and the facility further having a degassing silo with a second chamber having a second polymer inlet, a second polymer outlet, a second gas inlet, and a second gas outlet, the method comprising the steps:

i) guiding a drying gas flow comprising a first gas mixture through the first gas inlet into the first chamber, ii) inserting the wet polymer pellets through the first polymer inlet into the first chamber, iii) drying the wet polymer pellets in a countercurrent provided by the drying gas flow and by using the mechanical agitator, thereby yielding dried polymer pellets, iv) transferring the dried polymer pellets through the first polymer outlet and the second polymer inlet into the second chamber, v) guiding a second gas mixture through the second gas inlet into the second chamber, vi) degassing the dried polymer pellets using the second gas flow, thereby transforming the second gas mixture into a third gas mixture comprising hydrocarbons, and vii) guiding a portion of the third gas mixture into the first chamber, wherein the wet polymer pellets inserted into the first chamber in step ii) have a temperature of from 20° C. to 80° C. and the second gas mixture guided into the second chamber in step v) have a temperature of from 20° C. to 80° C. and wherein the dried polymer pellets having a reduced hydrocarbon content are withdrawn from the second chamber through the second polymer outlet and the dried polymer pellets withdrawn through the second polymer outlet have a temperature which is from 0.1° C. to 20° C. higher than the temperature of the second gas mixture guided into the second chamber.

2. The method of claim 1, wherein the portion of the third gas mixture forms the first gas mixture and is guided through the first gas inlet into the first chamber, or wherein the portion of the third gas mixture does not form the first gas mixture, but is added to the drying gas flow of the first gas mixture and is guided through the first gas inlet into the first chamber, or wherein the first chamber has a third gas inlet spaced apart from the first gas inlet and the portion of the third gas mixture is guided through the third gas inlet into the first chamber.

3. The method of claim 1, wherein the polymer pellets are polyolefin pellets.

4. The method of claim 1, wherein the polymer pellets comprise low density polyethylene.

5. The method of claim 1, wherein the facility comprises a first separation unit having a separation sieve, wherein agglomerates are removed using the separation sieve prior to insertion of the wet polymer pellets into the first chamber.

6. The method of claim 5, wherein the first separation unit is placed adjacent to the first chamber being at least partially at the same height as the first gas outlet or as the first polymer outlet.

7. The method of claim 1, wherein
the drying gas flow becomes wet during the drying process and the resulting wet gas mixture is guided through the first gas outlet to a cyclone separator and through the cyclone separator to at least one suction fan,
wherein the cyclone separator removes remaining polymer pellets, other particles or condensed fluid droplets,
wherein the suction fan evacuates the wet gas from the first chamber and though the cyclone separator.

8. The method of claim 1, wherein the first gas flow, the third gas flow, or both are heated prior to being guided into the first chamber using a first heating unit.

9. The method of claim 8, wherein the first heating unit is a steam-operated heater.

10. The method of claim 1, wherein the wet pellets are conveyed by process water of an underwater pellet cutter, for inserting into the first chamber in accordance with step ii).

11. The method of claim 1, wherein the first, second and third gas mixtures predominantly contain nitrogen, oxygen, or both.

12. The method of claim 1, wherein the first gas inlet is arranged centrally at the upper end, thereby the drying gas flow is directed towards the opposing bottom end.

13. A process for manufacturing LDPE-pellets in an industrial plant, the industrial plant having a reactor for polymerization reactions, an extruder and a facility,
the facility having a dryer with a first chamber having an upper and a lower end having a first polymer inlet, a first polymer outlet above the first polymer inlet, a first gas inlet at the upper end, a first gas outlet below the first gas inlet and a mechanical agitator, and
the facility further having a degassing silo with a second chamber having a second polymer inlet, a second polymer outlet, a second gas inlet, and a second gas outlet,
the process comprising the steps:
a) polymerizing ethylene in the reactor at a temperature of 140 to 320° C. and a pressure of 1400 to 3200 bar, thereby yielding a LDPE polymer,
b) separating the LDPE polymer and ethylene and recycling unreacted ethylene,
c) extruding the LDPE polymer to obtain a homogenized LDPE melt,
d) pelletizing the LDPE melt to obtain wet LDPE pellets using an underwater pellet cutter, and e) drying and degassing the wet LDPE pellets using the method of claim 1.

14. A process for manufacturing LDPE-pellets in an industrial plant,
the industrial plant having a reactor for polymerization reactions, an extruder and a facility,
the facility having a dryer with a first chamber having an upper and a lower end having a first polymer inlet, a first polymer outlet above the first polymer inlet, a first gas inlet at the upper end, a first gas outlet below the first gas inlet and a mechanical agitator, and
the facility further having a degassing silo with a second chamber having a second polymer inlet, a second polymer outlet, a second gas inlet, and a second gas outlet,
the process comprising the steps:
a) polymerizing ethylene in the reactor at a temperature of 140 to 320° C. and a pressure of 1400 to 3200 bar, thereby yielding a LDPE polymer,
b) separating the LDPE polymer and ethylene and recycling unreacted ethylene,
c) extruding the LDPE polymer to obtain a homogenized LDPE melt,
d) pelletizing the LDPE melt to obtain wet LDPE pellets using an underwater pellet cutter,
e.i) guiding a drying gas flow comprising a first gas mixture through the first gas inlet into the first chamber,
e.ii) inserting wet polymer pellets through the first polymer inlet into the first chamber,
e.iii) drying the wet polymer pellets in a countercurrent provided by the drying gas flow and by using the mechanical agitator, thereby yielding dried polymer pellets,
e.iv) transferring the dried polymer pellets through the first polymer outlet and the second polymer inlet into the second chamber,
e.v) guiding a second gas mixture through the second gas inlet into the second chamber,
e.vi) degassing the dried polymer pellets using the second gas flow and thereby transforming the second gas mixture into a third gas mixture comprising hydrocarbons, and
e.vii) guiding a portion of the third gas mixture into the first chamber,
wherein the wet polymer pellets inserted into the first chamber in step ii) have a temperature of from 20° C. to 80° C. and the second gas mixture guided into the second chamber in step v) have a temperature of from 20° C. to 80° C. and
wherein the dried polymer pellets having a reduced hydrocarbon content are withdrawn from the second chamber through the second polymer outlet and the dried polymer pellets withdrawn through the second polymer outlet have a temperature which is from 0.1° C. to 20° C. higher than the temperature of the second gas mixture guided into the second chamber.

15. The process of claim 14, wherein the portion of the third gas mixture forms the first gas mixture and is guided through the first gas inlet into the first chamber, or wherein the portion of the third gas mixture does not form the first gas mixture, but is added to the drying gas flow of the first gas mixture and is guided through the first gas inlet into the first chamber, or wherein the first chamber has a third gas inlet spaced apart from the first gas inlet and the portion of the third gas mixture is guided through the third gas inlet into the first chamber.

16. The process of claim 14, wherein
the drying gas flow becomes wet during the drying process and the resulting wet gas mixture is guided through the first gas outlet to a cyclone separator and through the cyclone separator to at least one suction fan, wherein the cyclone separator removes remaining polymer pellets, other particles or condensed fluid droplets, wherein the suction fan evacuates the wet gas from the first chamber and though the cyclone separator.

17. The process of claim 14, wherein the first gas flow, the third gas flow, or both are heated prior to being guided into the first chamber using a first heating unit.

18. The process of claim 14, wherein the first gas inlet is arranged centrally at the upper end, thereby the drying gas flow is directed towards the opposing bottom end.

* * * * *